United States Patent [19]

Bains et al.

[11] 4,199,907
[45] Apr. 29, 1980

[54] PANEL JOINT

[75] Inventors: Gurdip S. Bains; Niles J. Martin, both of Bonneville; Leigh F. Jackson, Guilford, all of Pa.

[73] Assignee: Westinghouse Electric Corp., Pittsburgh, Pa.

[21] Appl. No.: 936,298

[22] Filed: Aug. 23, 1978

[51] Int. Cl.² ............................................. E04B 1/38
[52] U.S. Cl. ..................................... 52/125; 52/285; 52/584; 403/231; 403/403; 403/409
[58] Field of Search ................... 292/342, 343; 52/285, 52/584, 125; 217/65; 403/403, 231, 409

[56] References Cited

U.S. PATENT DOCUMENTS

| 1,889,753 | 12/1932 | Madsen | 292/343 X |
| 2,490,018 | 12/1949 | Davis | 292/342 X |
| 2,970,677 | 2/1961 | Springs, Jr. et al. | 52/584 X |
| 3,632,146 | 1/1972 | Buzby | 52/285 |
| 3,830,030 | 8/1974 | Yoshida | 52/285 |

FOREIGN PATENT DOCUMENTS 265089  2/1927  United Kingdom ..................... 403/403

Primary Examiner—Alfred C. Perham
Attorney, Agent, or Firm—D. R. Lackey

[57] ABSTRACT

A panel joint for joining two upstanding panel members at right angles to one another. A right angle joining member has slots which cooperate with spacers on the panel members. The spacers on at least one of the panel members include a cam surface which cooperates with a tapered transition portion of the slots in one of the leg portions of the right angle joining member, to facilitate joining panels having surfaces which may not be absolutely flat.

5 Claims, 8 Drawing Figures

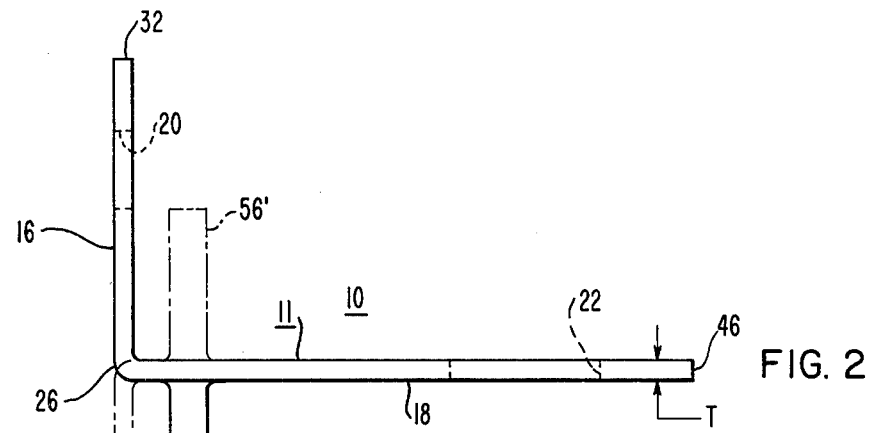
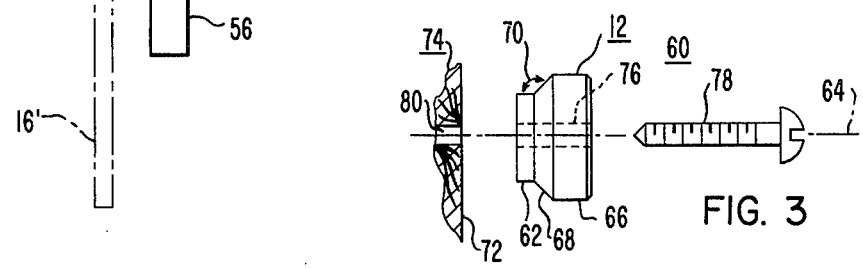
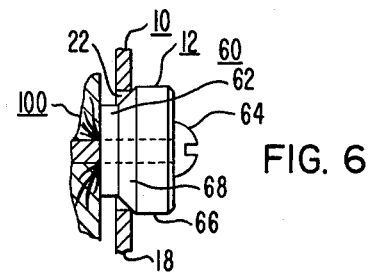
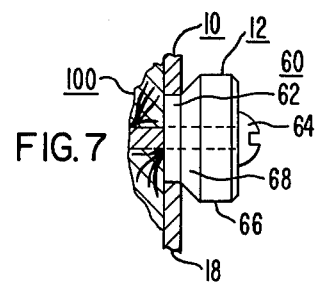
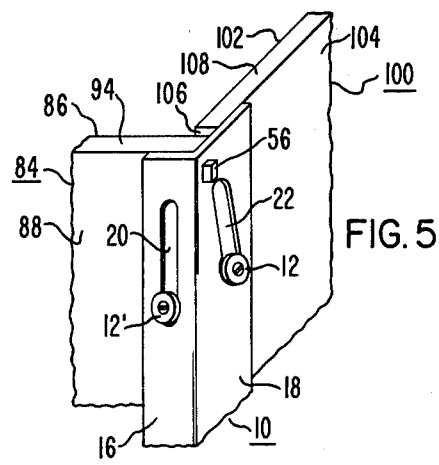
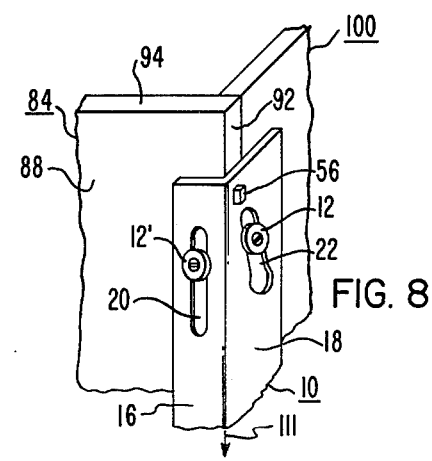

PANEL JOINT

BACKGROUND OF THE INVENTION

1. Field of the Invention

The invention relates in general to panel joints, and more specifically to panel joints for joining two upstanding panel members at right angles to one another.

2. Description of the Prior Art

It is well known in the art to join two panel members via a right angle joining member having slots in one leg portion which cooperate with screws fixed to the panel members. U.S. Pat. Nos. 1,889,753 and 2,490,018 and U.K Pat. No. 265,089 disclose examples of such panel joints.

With the joint constructions set forth in these patents, the screws need not be advanced to their final positions until the joining member has been vertically advanced to its final position. Thus, sufficient spacing between the head of the screw and the associated panel may be maintained to accomodate any bow or out-of-flatness in the panels. Once the joining member is advanced to its final position, the screws are tightened to maintain the assembly. This prior art arrangement is suitable when the screws are accessible after the panel members are joined, so that they may be securely tightened.

In certain applications, however, the panel members to be joined form a room or cubicle, and it is essential that the joining hardware be concealed. Thus, the joining hardware must be applied to the back sides of the panels, i.e., those surfaces outside the cubicle. Further, these applications require the room or cubicle to be assembled within a space which denies access to the back sides of the panel, once they are placed in upstanding adjacent positions preparatory to the joining step. An example of such an application is the assembly of a wood, or non-metal, elevator cab on a platform in the hatch or hoistway of a building. The panels which form the cab are located about one inch from the sides of the platform, and the platform is so close to the walls of the hoistway that an assembler would find it difficult or impossible to work between the panels and the hoistway walls. Typical spacings between the platform and hoistway walls are two inches between the platform and the front and back walls, and eight inches between the platform and the side walls.

Panel members used to form an elevator cab, for example, are relatively thick and heavy, and their surfaces may not be perfectly flat. The weight and non-flatness add to the problem of assembling such panels with tight joints in a restricted space where the back sides of the panels are not directly accessible to the assembler.

The joints between the panel members must be tight along the complete length of the joint. Further, the joint must stay tight during usage of the cubicle or room, even when the cubicle is subjected to movement, such as in the hereinbefore mentioned elevator cab application.

It would thus be desirable to provide a new and improved panel joint for relatively large, heavy panels which enables the panels to be quickly and tightly joined with the desired vertical orientation of the panel surfaces. It would further be desirable to remove or reduce any bow or out-of-flatness condition of the panel members, if these objectives can be achieved without increasing assembly time. Still further, since the panels may be required to be assembled in locations which have very little space adjacent to the back sides of the panels, the joining member must be such that it does not require access to the back sides of the panel members.

SUMMARY OF THE INVENTION

Briefly, the present invention is a new and improved panel joint for interconnecting first and second upstanding panel members at right angles. A right angle joining member is slidably fixed to the first panel member via a plurality of vertically oriented slots in one leg thereof, and a plurality of cooperative first spacer members fixed to one of the panel members. The other leg of the joining member includes a plurality of inclined slots having an enlarged, spacer head receiving portion at one end, and a tapered transition portion between the enlarged portion and inclined slot portion. The second panel member includes a plurality of second spacer members which include shank and head portions, and an inclined cam surface between the head and shank portions. The inclined cam surface cooperates with the tapered transition of the inclined slot, to cam the adjacent surface of the panel member tightly against the joining member, flattening and properly aligning the panel members before further vertical movement of the joining member forces the panel members tightly together via the orientation of the inclined slots.

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIG. 2 is a plan view of the joining member shown in FIG. 1, after it has been bent into a right angle configuration;

FIG. 3 is an exploded view, in elevation, of a spacer member assembly which includes a panel member and fastening means for fixing a spacer member to a panel member;

FIG. 5 is a fragmentary, perspective view illustrating a first step in the assembly of a second panel member to the first panel member shown in FIG. 4;

FIG. 6 is an elevational view of a spacer member on the second panel member shown in FIG. 5, illustrating the cooperation between a slot in the joining member and a cam surface on the spacer member, at the start of vertical movement of the joining member;

FIG. 7 is an elevational view of a spacer-slot assembly which is similar to that of FIG. 6, except after sufficient vertical movement of the joining member has taken place to cam the panel surface into a flat position against the joining member; and FIG. 8 is a fragmentary, perspective view, similar to that of FIG. 5, except after vertical movement of the joining member has been completed, with the side edge of the second panel member tightly butted against the front surface of the first panel member.

DESCRIPTION OF PREFERRED EMBODIMENTS

The invention is a new and improved panel joint for joining relatively large and heavy panel members at right angles to one another, such as wood panels, or panels constructed of a wood substitute. For example, the panels may be assembled to form the cab of an elevator car. The new and improved panel joint includes a metallic, elongated, right angle joining member 10, best shown in FIGS. 1 and 2, and a plurality of metallic spacer members 12, best shown in FIG. 3.

Figure 1:
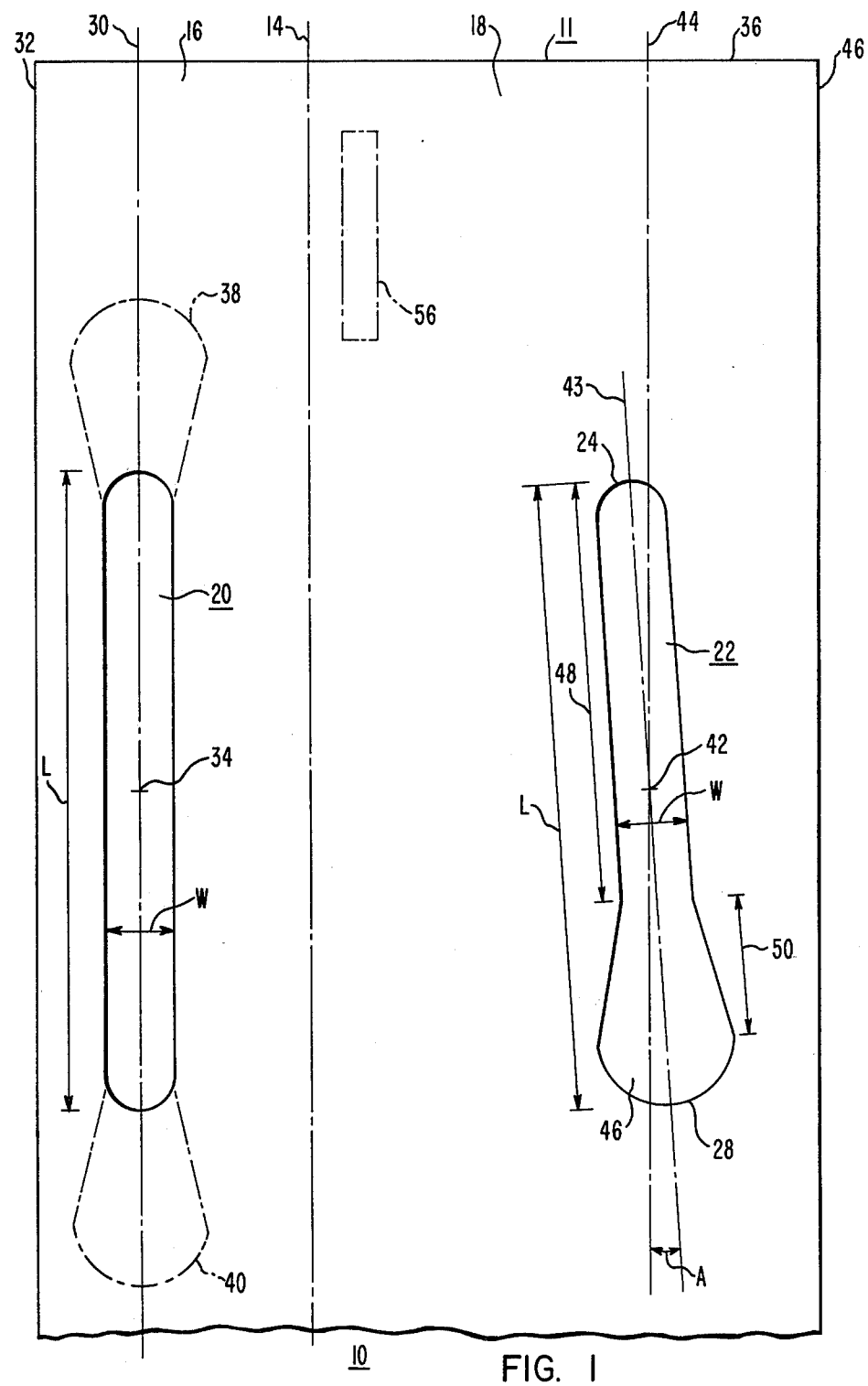
FIG. 1 is a fragmentary view, in elevation, of a new and improved joining member constructed according to the teachings of the invention, shown before it is bent into a right angle configuration.

More specifically, FIG. 1 is a fragmentary view, in elevation, of joining member 10, with joining member 10 being shown in its flat configuration before being bent into the final right angle configuration. Joining member 10 includes a metallic plate member 11, such as a steel plate, with the plate member 11 being bent along a bend line 14 to provide a right angle member having first and second leg portions 16 and 18, respectively, best shown in FIG. 2. Plate member 11, before bending, has suitable thickness, width and length dimensions to provide the required mechanical strength, such as 0.090 inch, 5.75 inches, and 88.5 inches, respectively. The length dimension is selected to be less than the height dimension of the associated panels by at least a predetermined dimension, with the length dimension being selected such that the joining member will not extend above or below the top and bottom edges respectively, of the panel members, after the joining member is in its assembled position.

A plurality of first elongated slots 20 are formed in the first leg portion 16, and a plurality of second elongated slots 22 are formed in the second leg portion 18. The longitudinal axes of the first slots 20 are vertically oriented, and the longitudinal axes of the second slots 22 are inclined such that the upper end 24 of the slot 22 is closer to the bend line 14, or to the resulting corner 26 shown in FIG. 2, than the lower end 28.

The longitudinal axes of the first slots 20 in the first leg portion 16 are all located on imaginary line 30, which line is parallel to and spaced from the left-hand edge 32 of plate member 11. For example, the spacing may be about 0.75 inch. Slot 20 may typically have a width W of 0.5 inch, and a length L of 4.62 inches. The center 34 of the uppermost slot 20 may be about 5.25 inches from the top edge 36 of the plate member 11, and the center of the lowermost slot may be similarly positioned relative to the bottom edge. The centers 34 of the slots 20 may be about 6 to 12 inches apart, as desired. It is to be understood that all dimensions given herein are for purposes of example only, and are not critical to the invention.

If the right angle joining member 10 is to be shipped to an assembly site with leg portion 16 already assembled with a panel member, the projections or spacers for cooperating with slots 20 may be inserted through the slot openings and fastened to the associated panel. Thus, the slots 20 may be formed as illustrated with the solid lines in FIG. 1, without an enlarged end. If the panel members are to be shipped to the assembly site without the right angle joining member assembled to certain of the panels, and with the spacers already attached to the panels, either end of slot 20 may be enlarged, as illustrated in phantom in FIG. 1, to receive the head of the associated spacer. For example, the upper end of slot 20 may be enlarged, as illustrated at 38, or the lower end may be enlarged, as illustrated at 40. When slot 20 has an enlarged end, its shape is important, but since the shape will be described in detail relative to slot 22, it will not be described at this point. When slot 20 is constructed to include an enlarged end, the length L plus the additional length added by the enlarged end is selected to exceed the length of slot 22. The additional length of slot 20, in this instance, enables slot 20 to already be in engagement with a spacer member when the joining member 10 is positioned such that a spacer member is ready to enter slot 22.

The second slots 22 in second leg portion 18 of plate member 11 have centers 42 which are all located on an imaginary line 44 which is parallel to, and spaced from the right-hand edge 46 of plate member 11. Unlike slots 20, however, the longitudinal axes 43 of slots 22 are not vertically oriented, but they are slightly inclined, such as by an angle A of about 4° from the vertical line 44. Slot 22 has an enlarged portion 46 at its lower end 28, a portion 48 which has parallel sides, which portion starts at the upper end 24, and a tapered transition 50 which extends between the enlarged portion 28 and portion 48. Enlarged portion 28 is constructed such that its lower end is in the form of a half circle having a diameter of about 1 inch, with the transition 50 extending from the ends of the half circle for about 1 inch where it joins portion 48. Portion 48 has a width W of about 0.5 inch. The tapered transition 50 is important to the invention, with its significance being hereinafter set forth when the construction of the spacer 12 is described. The overall length L of slot 22 is about the same as the overall length L of slot 20, when slot 20 does not include an enlarged end portion. As hereinbefore stated, when slot 20 has an enlarged end, it has a longer dimension L than slot 22 to permit slot 20 to already be engaged with a spacer member, when a spacer is introduced into the enlarged opening of slot 22.

FIG. 2 is a plan view of joining member 10, with leg portion 16 indicated by the solid lines forming a right-hand version of the right angle joining member 10, and the leg portion 16' shown in phantom indicates a left-hand version of the right angle joining member. A force receivable projection or metallic block 56 is welded to one of the leg portions, such as leg portion 18. Block 56', shown in phantom, illustrates the location of the force receivable block for the left-hand version of the joining member 10. Block 56 may be used to apply a vertically downward force to joining member 10, such as with a hammer, once all of the slots 20 and 22 have engaged a spacer member 12, in order to achieve the final tight assembled position of the joining member 10 relative to the panel members it is joining. Block 56 may also be used to disassemble the panel members, should disassembly become necessary.

It will be noted from FIG. 2 that leg portion 18 is wider than leg portion 16. As illustrted in FIG. 8, this is because leg portion 18 accommodates the thickness dimension of the panel associated with leg portion 16, before leg portion 18 comes into contact with the panel it is associated with.

FIG. 3 is an exploded, elevational view of a spacer assembly 60 which includes a spacer 12 constructed according to the teachings of the invention. Spacer 12 is constructed to cooperate with the tapered transition 50 of slot 22. If slot 20 has an enlarged end 38 or 40, the enlarged end would be constructed similar to that of slot 22, and spacer 12 would also be used for cooperating with slot 20. If slot 20 is constructed without an enlarged end, spacer 12 may still be used, or the spacer for slot 20 may be of a slightly different construction, as will be hereinafter explained.

More specifically, spacer 12 is a metallic member which includes a smooth, round shank portion 62 having a predetermined diameter, which diameter is slightly less than the width W of slot 22, such as about 0.485 inch. The shank portion 62 has a length dimension in the direction of the longitudinal axis 64, which is slightly greater than the thickness dimension T of the right angle joining member 10, such as 0.110 inch.

Spacer member 12 further includes a smooth, round head portion 66 having a diameter selected to enable it to enter the enlarged end of slot 22, such as a diameter of about 0.75 inch. Instead of the shank 62 and head 66 joining at right angles relative to one another, such that the underside of the head forms a flange, an angled or tapered cam surface 68 is provided between shank 62 and head 66. Surface 68 provides a predetermined angle 70 with shank 62, such as an angle of about 45°.

Spacer member 12 is secured to the back surface 72 of a panel member 74 via suitable fastener means. As illustrated, spacer member 12 may have an opening 76 coaxial with its longitudinal axis 64, for receiving a screw 78. A pilot opening 80 may be pre-drilled in panel member 74, to accurately locate and guide the screw 64. A plurality of spacer members 12 would be attached to the back surface of a panel, with the centers of the spacer member all being located on a common vertical imaginary line spaced a predetermined dimension from the side of the panel.

As hereinbefore stated, if slot 20 has an enlarged end, the spacer members for cooperating with slot 20 may be constructed as illustrated in FIG. 3. If slot 20 does not have an enlarged end, cam surface 68 may be eliminated and head 66 may join shank 62 at right angles relative to one another, such that the underside of the head forms a flange. However, in practice, spacer 12 is used for both slots, regardless of the configuration of slot 20.

Figure 4:
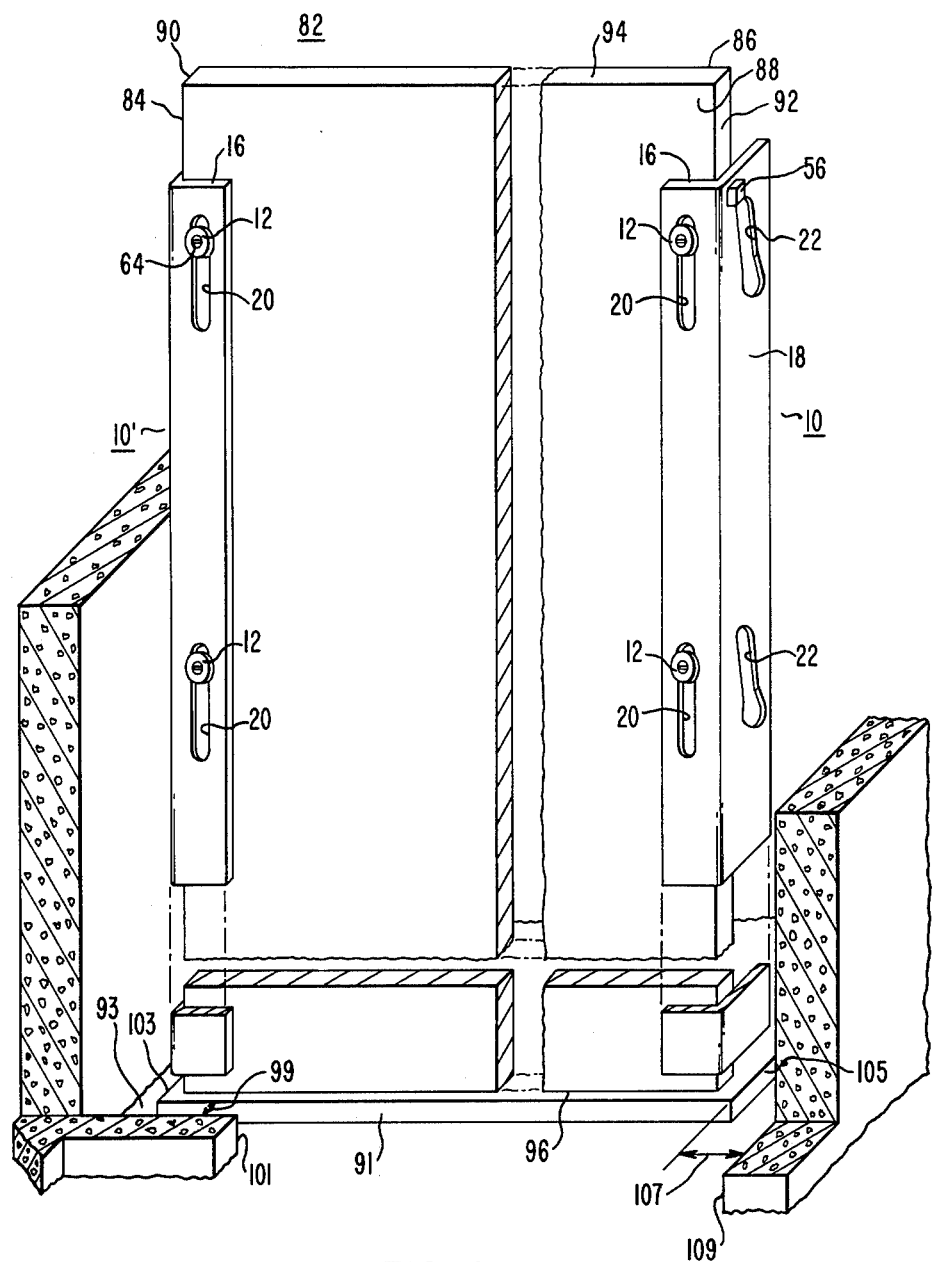
FIG. 4 is a perspective view of a first panel member having two joining members slidably attached thereto, ready for attaching two additional panel members thereto at right angles to the first panel member.

FIG. 4 is a perspective view of a panel assembly 82 which includes a panel member 84, a right-hand right angle joining member 10, and a left-hand right angle joining member 10'. Panel member 84, which is typically formed of wood, or a wood substitute such as a laminated plastic, includes front and back surfaces 86 and 88, respectively, first and second vertically extending side or edge portions 90 and 92, respectively, and upper and lower edge portions 94 and 96, respectively. Panel assembly 82 is shipped to the assembly site, as illustrated, with the first leg portions 16 of the joining members 10 slidably fixed to the back surface 88 of panel member 84 via a plurality of spacer members 12'. Panel members 84 is prepared with accurately located pilot holes drilled therein. The right angle members 10' and 10 are placed in position adjacent to edges 90 and 92, respectively, and the spacer members 12' have their shanks placed through the slots 22, the central opening of the spacer members are aligned with the pilot holes, and they are then secured to the panel 84 with screws 64.

While not essential to the invention, assembly of panel members is facilitated if a slidable friction fit is provided between slots 20 and their associated spacers 12, such that the assembler may slide the right angle member 10 to a desired position, and the member 10 will retain this position. A spring washer may be used to provide this function, if desired. Thus, the assembler may select a predetermined position for right angle member 10 which orients the enlarged ends of slots 22 with the spacer members 12 of the panel member to be joined. Once selecting this position, the assembler is free to position the panels without holding on to the joining member 10.

FIG. 4 illustrates panel assembly 82 disposed on an elevator car platform 91 which is disposed in a hatch or hoistway 93 of a building 95. Platform 91 has a back side or edge 97 which is a predetermined small dimension 99 from a wall 101 of hoistway 93, such as two inches. Platform 91 has side edges 103 and 105 which are typically spaced seven or eight inches from the adjacent walls, such as indicated by dimension 107 between side edge 105 and a wall 109. It will be noted that the construction of right angle member 10 is such that the assembler need only reach projection 56 from above the tops of the panels, while positioned on the platform side of the panels, and that the projection 56 is on the side with the seven or eight inch clearance.

FIG. 5 illustrates a first step in joining panel member 84 with a panel 100. Panel member 100 may be similar to panel member 84, having front and back surfaces 102 and 104, respectively, a side edge 106 to be joined to panel member 84, and a top edge 108. Panel member 100 includes a plurality of spaced members 12 constructed as shown in FIG. 3, which spacer members are fixed in spaced relation on a common vertical imaginary line which is parallel with edge 106. Panel member 100 is placed in an upright position with its edge 106 adjacent to the front surface 86 of panel 84, and adjacent to edge 92 of panel member 84. The right angle joining member 10 is lifted and vertically positioned, as hereinbefore mentioned, until the enlarged openings at the lower ends of slots 22 are oriented with spacer member 12. The joining member 10, in this raised position, may extend beyond the top edges 94 and 108 of the panel members 84 and 100, respectively, as long as it will not be above these edges in the final position of the joining member 10.

FIG. 6 illustrates the cooperative relationship between the tapered transition 50 of slot 22 and the cam surface 68 on spacer member 12. With the spacer member 12 in position in the enlarged opening of slot 22, the wide portion of the tapered section 50 of slot 22 will engage the cam surface 68 of spacer member 12 as soon as joining member 10 is lowered. Continued downward movement of the joining member 10 results in the narrowing taper of slot 22 camming the panel 100 into engagement with the leg portion 18 of joining member 10. FIG. 7 illustrates the position of the spacer member 12, the joining member 10, and the panel 100, when the spacer member has reached portion 48 of slot 22.

Thus, with the tapered transition of slot 22 and the cam surface 68 of the spacer member, the spacer members 12 are easily captured by the slots 22, notwithstanding a bow in the panel 12, and the cam-slot cooperation then properly orients the panel while removing any bow therein, such that by the time the spacer 12 reaches the lower end of portion 48, the panel is flat and vertically oriented.

Continued downward movement of the joining member 10, which may be facilitated with a force applied to the upper surface of block 56, causes panel member 100 to be drawn tightly to panel 84 via the inclined orientation of the slots 22. The final assembled position is shown in FIG. 8, with arrow 111 indicating that the joining member 10 has been moved in a downward direction to achieve this final assembled position.

We claim as our invention:

1. A panel joint, comprising:

first and second non metallic upstanding panel members having front and back surfaces, and vertically extending side portions, said first and second panel members being arranged at right angles, with selected vertical side portions adjoining one another, with the back surfaces of the panels on the outside of the right angle configuration, a plurality of first spacer members having head and shank portions, said first spacer members being fixed to the back surface of said first panel member, in spaced relation with one another along the side portion which adjoins the second panel member, with their head portions spaced from the back surfaces of the first panel member, a plurality of second spacer members having head and shank portions, and a tapered cam surface which tapers inwardly from the head portion to the shank portion, said second spacer members being immovably fixed to the back surface of said second panel member, in spaced relation with one another, and adjacent to the side portion which adjoins the first panel member, and an elongated right angle joining member having first and second leg portions which define a corner portion at their intersection, said first leg portion having a plurality of spaced elongated first slots, the sides of which are parallel with the corner portion, said second leg portion having a plurality of spaced elongated second slots, with each of said second slots including a first portion having sides which are parallel with one another but inclined relative to the corner portion, an enlarged spacer head receiving portion, and a third portion which defines a tapered transition between the first and second portions, said plurality of first spacer member extending through the plurality of first slots such that said joining member is captured by, but vertically slidable relative to, said first panel member, said head portions of the second spacer members being insertable through the enlarged spacer head receiving second portions of the second slots, with the tapered transitions thereof cooperating with the cam surfaces of the second spacer member such that an initial downward movement of the joining member will cam the back surface of said second panel member against the second leg portion of the joining member, and continued downward movement will cause the inclined slots of the second elongated slots to cooperate with the shank portion of the second spacer members to force the first and second panel members tightly together.

2. The panel joint of claim 1 including a force receivable projection on the joining member, fixed to the outside of the right angle configuration.

3. The panel joint of claim 1 wherein the first slots include an enlarged spacer head receiving portion at one end thereof.

4. The panel joint of claim 3 wherein the longitudinal dimension of each of the first slots exceeds the longitudinal dimension of each of the second slots, enabling the first slots to have already captured the head portions of the first spacer members when the enlarged spacer head receiving portions of the second slots are aligned with the head portions of the second spacer members.

5. The panel joint of claim 1 wherein the length of the shank portion of the second spacer member is substantially the same as the thickness dimension of the joining member.

* * * * *